United States Patent
Natanzon

(10) Patent No.: US 8,806,161 B1
(45) Date of Patent: Aug. 12, 2014

(54) MIRRORING SPLITTER META DATA

(75) Inventor: Assaf Natanzon, Ramat-Gan (IL)

(73) Assignee: EMC Corporation, Hopkinton, MA (US)

( * ) Notice: Subject to any disclaimer, the term of this patent is extended or adjusted under 35 U.S.C. 154(b) by 480 days.

(21) Appl. No.: 13/248,978

(22) Filed: Sep. 29, 2011

(51) Int. Cl.
*G06F 12/02* (2006.01)
*G06F 3/06* (2006.01)
*G06F 11/20* (2006.01)
*G06F 17/30* (2006.01)

(52) U.S. Cl.
CPC ............ *G06F 3/065* (2013.01); *G06F 11/2056* (2013.01); *G06F 2201/855* (2013.01); *G06F 17/30575* (2013.01)
USPC ........... 711/162; 711/112; 711/114; 711/156; 707/655; 714/6.23; 714/6.32

(58) Field of Classification Search
CPC .......... G06F 11/2056; G06F 2201/855; G06F 3/065; G06F 17/30575
USPC .................. 711/162, 112, 114, 156; 707/655; 714/6.23, 6.32
See application file for complete search history.

(56) References Cited

U.S. PATENT DOCUMENTS

| | | | | |
|---|---|---|---|---|
| 7,577,867 B2 * | 8/2009 | Lewin et al. | ................. | 714/6.32 |
| 7,774,565 B2 * | 8/2010 | Lewin et al. | ................. | 711/162 |
| 7,908,515 B1 * | 3/2011 | Schechner et al. | ............. | 714/15 |
| 8,024,534 B2 * | 9/2011 | Bartfai et al. | ................. | 711/162 |
| 8,103,937 B1 * | 1/2012 | Natanzon et al. | ............. | 714/763 |
| 8,214,612 B1 * | 7/2012 | Natanzon | ...................... | 711/162 |
| 8,271,447 B1 * | 9/2012 | Natanzon et al. | ............. | 707/660 |
| 8,332,687 B1 * | 12/2012 | Natanzon et al. | ............. | 714/6.3 |
| 8,335,771 B1 * | 12/2012 | Natanzon et al. | ............. | 707/684 |
| 8,380,885 B1 * | 2/2013 | Natanzon | ......................... | 710/5 |
| 8,429,362 B1 * | 4/2013 | Natanzon et al. | ............. | 711/162 |
| 8,464,101 B1 * | 6/2013 | Natanzon et al. | ............. | 714/38.1 |
| 8,527,721 B2 * | 9/2013 | Atluri et al. | ................... | 711/162 |
| 8,601,225 B2 * | 12/2013 | Atluri et al. | ................... | 711/162 |
| 2013/0103650 A1 * | 4/2013 | Natanzon et al. | ............. | 707/684 |

* cited by examiner

*Primary Examiner* — Stephen Elmore
(74) *Attorney, Agent, or Firm* — Krishnendu Gupta; Joseph D'Angelo

(57) ABSTRACT

A method, system and computer program product for data replication comprising receiving an IO at a first storage processor (SP), sending metadata corresponding to the IO to a second SP, receiving an acknowledgement from the second SP indicating the second SP received the metadata and send the IO down an IO stack.

18 Claims, 10 Drawing Sheets

MIRRORING SPLITTER META DATA

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system and computer program product for data replication comprising receiving an IO at a first storage processor (SP), sending metadata corresponding to the IO to a second SP, receiving an acknowledgement from the second SP indicating the second SP received the metadata and send the IO down an IO stack.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
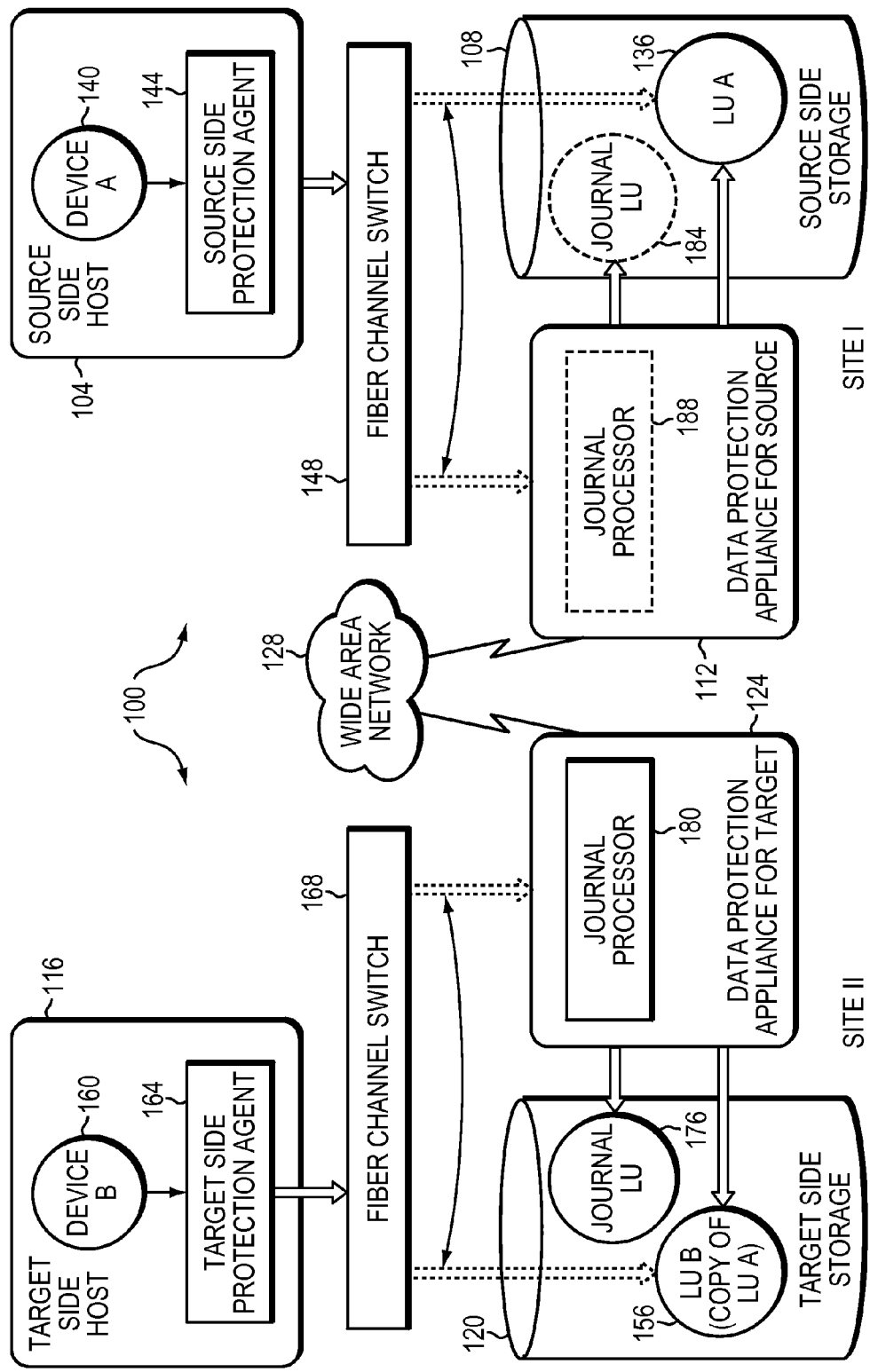
FIG. 1 is a simplified illustration of a data protection system, in accordance with an embodiment of the present disclosure.

Thus, a typical storage system may provide high availability to the data which is stored. Generally, a storage array may have at least two storage processors (SP) to enable one of the SPs to fail while still enabling the data storage system to function. Conventionally, the SPs are connected through a link with high bandwidth and low latency. Generally, a failure of one element in a storage system such as storage processor, or data protection appliance should not have a significant impact on the data path, i.e. the ability to write or read data.

Typically however, if data marking the execution of the read and write IO is lost, the system may need to do a full sweep of the data in order to make sure that the production and replica storage device are identical. Usually, a full sweep is an expensive procedure which reads all the data from the production storage array and compares it to the replica storage array data. Conventionally, a replication product where a failure of one component such as data protection appliance (DPA) or storage processor causes a complete full sweep of the data causes excessive down time, which negatively impacts the data center and is undesirable for users of the data storage system.

In conventional implementations, data is first sent to the DPA and then sent down the storage IO stack. In this conventional implementation, if the storage processor fails the data may have already arrived to the DPA. Typically, the DPA knows which IO arrived to the storage regardless if the IO completed or not. Usually, after a SP crashes, if no acknowledgement has reached the host, there may be no way to know if the IO was written to the backend devices, the DPA may re-sync the data of the latest IO operations, as it may not be known if the IOs completed. Generally, if the DPA crashes the splitter may know which IOs where in the cache of the DPA due to a protocol between the splitter and the DPA. Conventionally, the disadvantages of this method may be that the IO latency is additive; i.e. a better approach may be to send the IO to both the DPA and the backend storage at the same time. Typically, in order to be able to split the data at the same time there may need to be mechanism which lets the system track the incoming IOs even if one component of the storage system or replication appliance is lost.

In an embodiment, the current disclosure may enable leveraging of the two SP of a storage array during replication to minor each IO meta data in both SPs. In some embodiments, a splitter in one of the SPs may intercept IO. In certain embodiments, the splitter may send metadata corresponding to the IO to the second SP through the interconnect between the SPs. In some embodiments, after metadata acknowledged at to the first SP by the second SP, the IO may be sent to both the replication appliance, and the IO stack. In most embodiments, the IO may be sent in any order to the replication appliance and down the IO stack including being sent to both at the same time. In further embodiments, in case of a failure of the splitter, the metadata of the second SP may include locations which may have not been written to the replication appliance. In at least some embodiments, the replication appliance may read the dirty locations from the second SP to enable resynchronization of data which may have not been replicated correctly due to the failure. In case of a replication appliance failure, the secondary replication appliance may take the role of the failed replication appliance, may read the tracked meta data from both SPs, in order to resynchronize data which might have been in the cache of the failed replication appliance.

The following definitions are employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Apr. 16, 2010 assigned to EMC Corp., which is hereby incorporated by reference.

A discussion of storage systems and storage system redundancy may be found in U.S. Pat. No. 7,209,979 entitled "STORAGE PROCESSOR ARCHITECTURE FOR HIGH THROUGHPUT APPLICATIONS PROVIDING EFFICIENT USER DATA CHANNEL LOADING" issued on Apr. 24, 2007 assigned to EMC Corp., which is hereby incorporated by reference.

A discussion of storage systems and storage system redundancy may also be found in U.S. patent application Ser. No. 13/172,517 entitled "SELECTING PHYSICAL STORAGE IN DATA STORAGE SYSTEMS" filed on Jun. 29, 2011 and U.S. patent application Ser. No. 12/980,912 entitled "MANANGING OWNERSHIP OF LOGICAL VOLUMES" filed on Dec. 29, 2010 both of which are assigned to EMC Corp. and are hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device.

When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
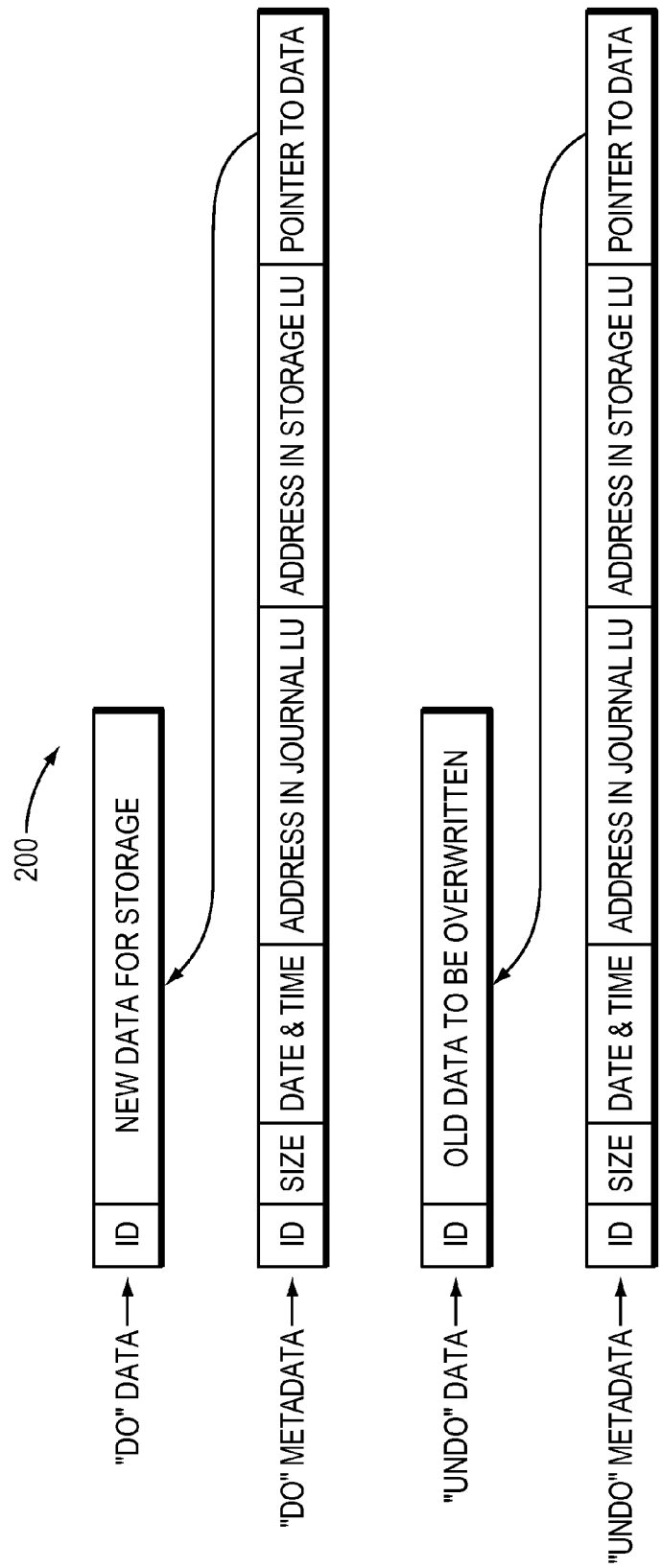
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
 one or more identifiers;
 a time stamp, which is the date & time at which the transaction was received by source side DPA 112;
 a write size, which is the size of the data block;
 a location in journal LU 176 where the data is entered;
 a location in LU B where the data is to be written; and
 the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Data Storage System

Figure 3:
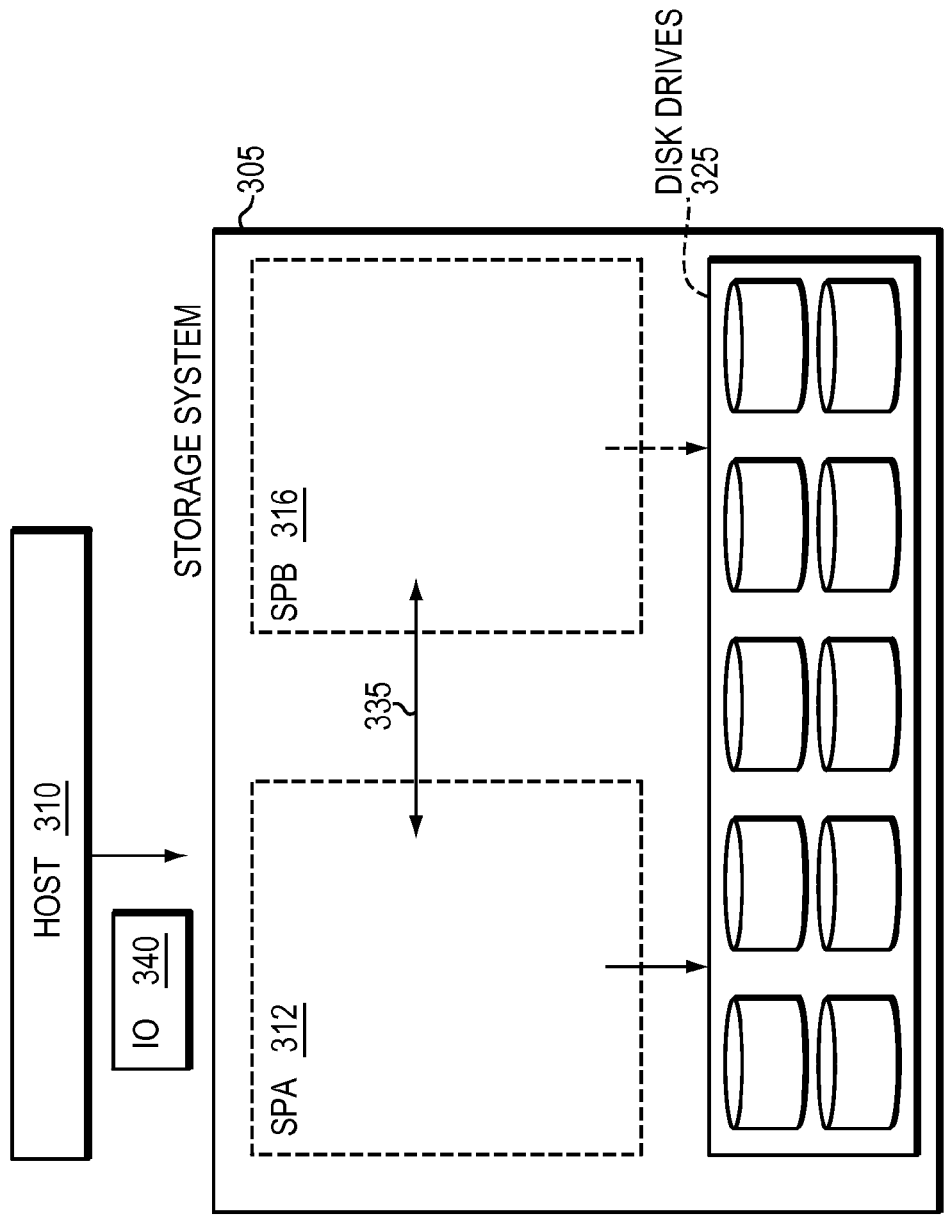
FIG. 3 is a simplified illustration of a storage system with two storage processors and storage mediums, in accordance with an embodiment of the present disclosure.

Refer now to the example embodiment of FIG. 3. In the example embodiment of FIG. 3, host 310 may communicate IO 340 to storage system 305. Storage system 305 has two storage processors, SPA 312 and SPB 316. The storage processors may communicate with a storage medium such as disk drives 325. IO 340 communicated from host 310 may be sent through storage processor SPA 312 or SPB 316 to Disk Drives 325. Storage processors SPA 312 and SPB 316 are connected by link 335. In some embodiments, the link may be quick link, such as a fiber connection, or shared PCI bus. In certain embodiments SPA 312 and SPB 316 may mirror IO between the storage processors to provide IO redundancy.

Figure 4:
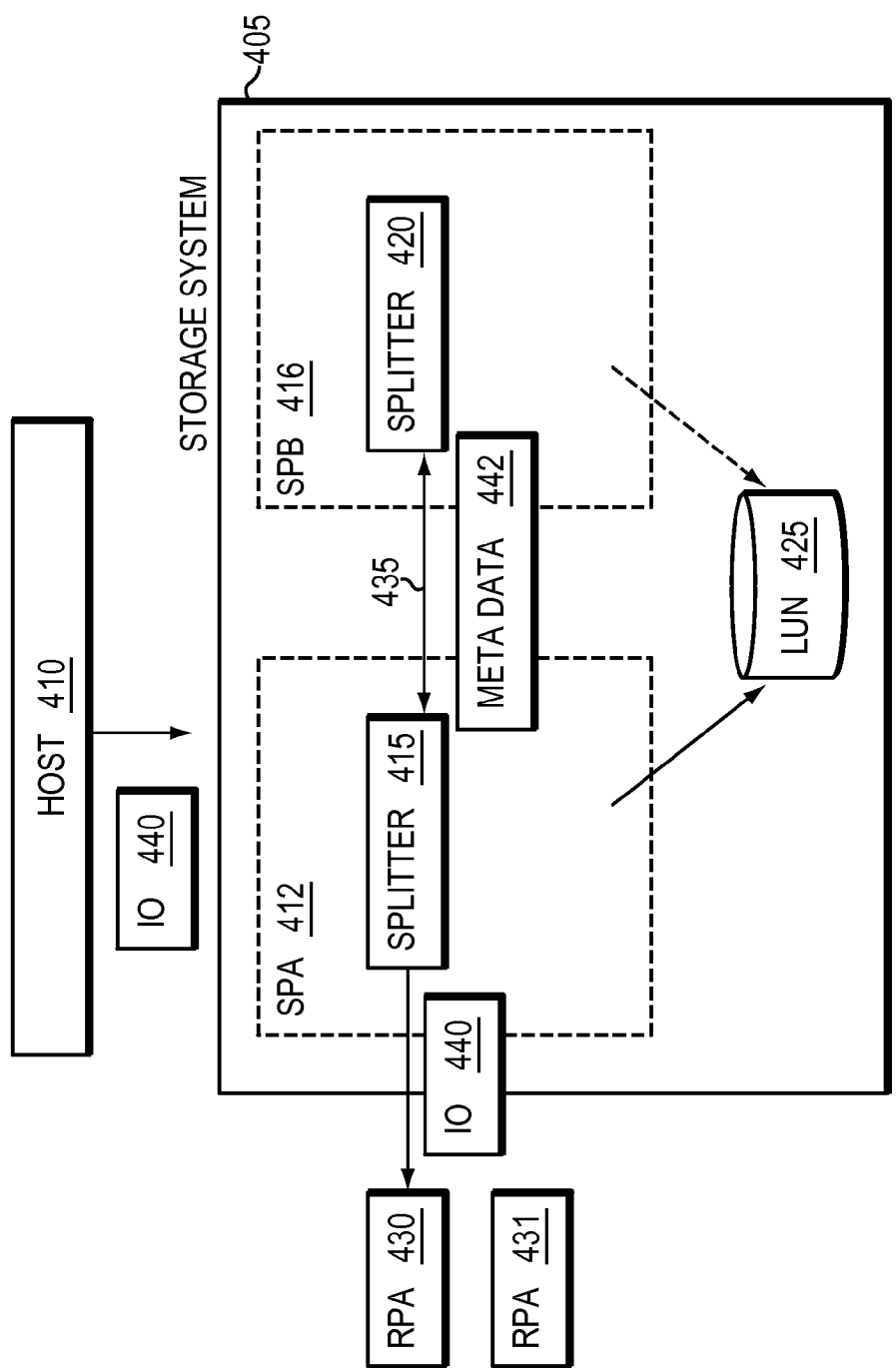
FIG. 4 is a simplified illustration of a storage system with two storage processors and a LUN and two replication protection appliances, in accordance with an embodiment of the present disclosure.

Refer now to the example embodiment of FIG. 4. In the example embodiment of FIG. 4, each storage processor, Storage processor SPA 412 and storage processor SPB 416 have a splitter, splitter 415 and splitter 420 respectively. Each storage processor SPA 412 and SPB 416 may expose LUN 425. In this embodiment, SPA 412 and SPB 414 expose LUN 425 as a logical unit created on the physical spindles or disks of FIG. 3. Storage system 405 may also communicate with RPA 430.

Figure 5:
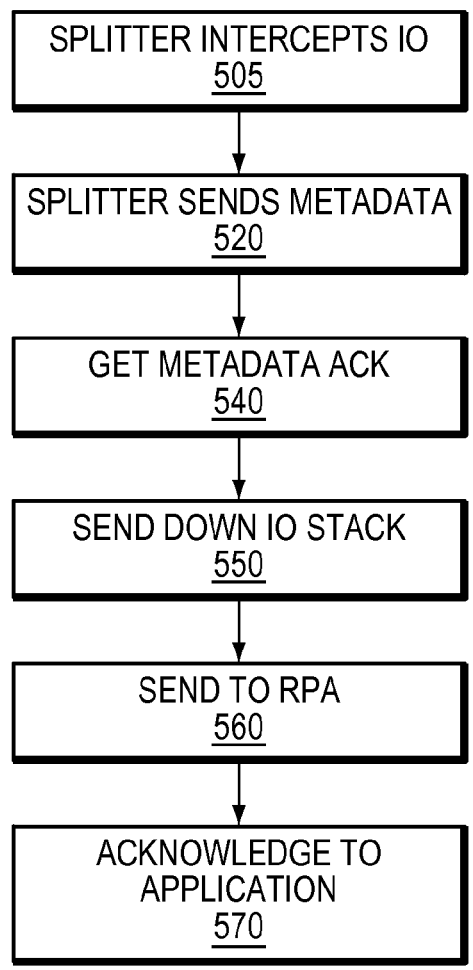
FIG. 5 is a simplified method for acknowledging replicated IO, in accordance with an embodiment of the present disclosure.

Refer now to the example embodiments of FIGS. 4 and 5. In these example embodiments, Splitter 415 intercepts IO 440 sent from host 410 to storage system 405 (step 505). Splitter 415 of SPA 412 sends metadata 442 corresponding to IO 440 to splitter 420 (step 520). Splitter 420 receives metadata 442 from splitter 415 (step 540) and acknowledge the meta data. Splitter 415 sends IO 440 down the IO stack to LUN 425 (step 550). In certain embodiments, the IO may be sent to the RPA and down the IO stack co-temporaneously i.e. at the same time. Splitter 415 sends IO 440 to the RPA (step 560). Given an acknowledgement of IO 440 sent by RPA 430 and acknowledgement from the IO stack, an acknowledgement may be sent to the application on host 425. Splitter 420 may be maintaining a list of the metadata sent to it by splitter 415.

Figure 6:
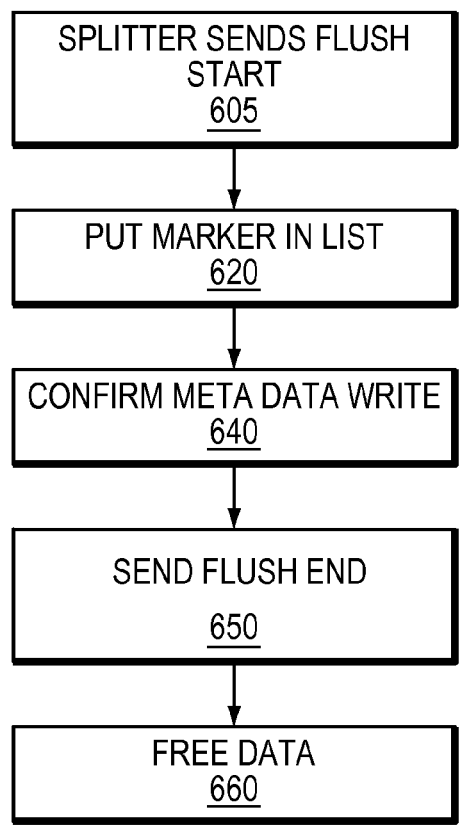
FIG. 6 is a simplified method for flushing IO meta data, in accordance with an embodiment of the present disclosure.

Refer now to the example embodiment of FIGS. 4 and 6. Periodically, Splitter 415 sends a flush start command to splitter 420 (step 605). Splitter 420 puts a marker in the list of meta data (step 620). Splitter 415 confirms that RPA 430 has written the IOs meta data (step 640) to the delta marker stream, the confirmation is done through a control communication channel which may also be implemented through fiber channel protocol or through any other protocol enabling the devices to communicate. Splitter 415 sends a flush end command to splitter 420 (step 650). Splitter 420 may free the metadata list up to the latest point marked by the flush meta data start command (step 660). The embodiments of FIGS. 4 and 6 may ensure, if SPA crashes, that the meta data of the latest IOs which may not have arrived to the replica site is either in the delta marker stream maintained by DPA 430 or in the cache of splitter 420.

Figure 7:
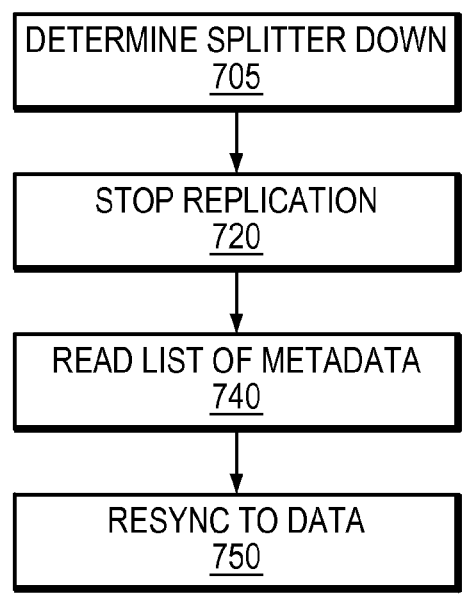
FIG. 7 is a simplified method for resyncing data after a splitter failure, in accordance with an embodiment of the present disclosure.

Refer now to the example embodiment of FIGS. 4 and 7, which describe an embodiment of the recovery from a failure of splitter 420 in SPA 412. A determination is made if splitter is down (step 705). Replication is stopped (step 720). The list of metadata is read (step 740) and the meta data read is added to the delta marking stream of the consistency group by DPA 430. Data is synched to the appliance based on the metadata list and the data in the delta marking stream (step 750). In most embodiments, the storage processors function symmetrically. Thus, if SPB 416 were to fail, it may be handled in the same way as a failure of SPA 412.

Figure 8:
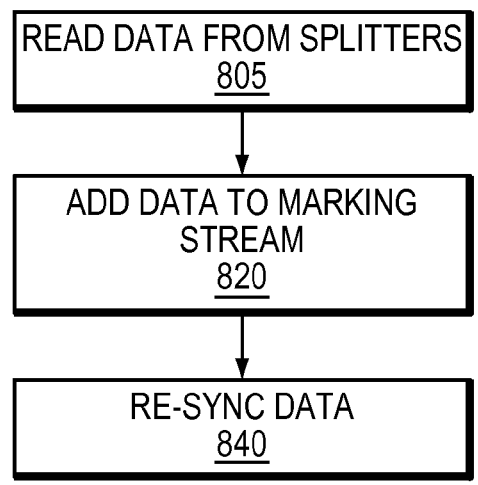
FIG. 8 is a simplified method for re-syncing data, in accordance with an embodiment of the present disclosure.

Refer now to the example embodiments of FIGS. 4 and 8. In these example embodiments, DPA 430 has failed. DPA 431 may begin replicating volume 425 for failed DPA 430. Meta data is read from both splitter 415 in SPA 412 and splitter 420 in SPB 416 (step 805). The metadata is added to the delta marking stream, written in journal maintained by the DPA replicating volume 425 (step 820). DPA 431 re-syncs the data (step 840).

Figure 9:
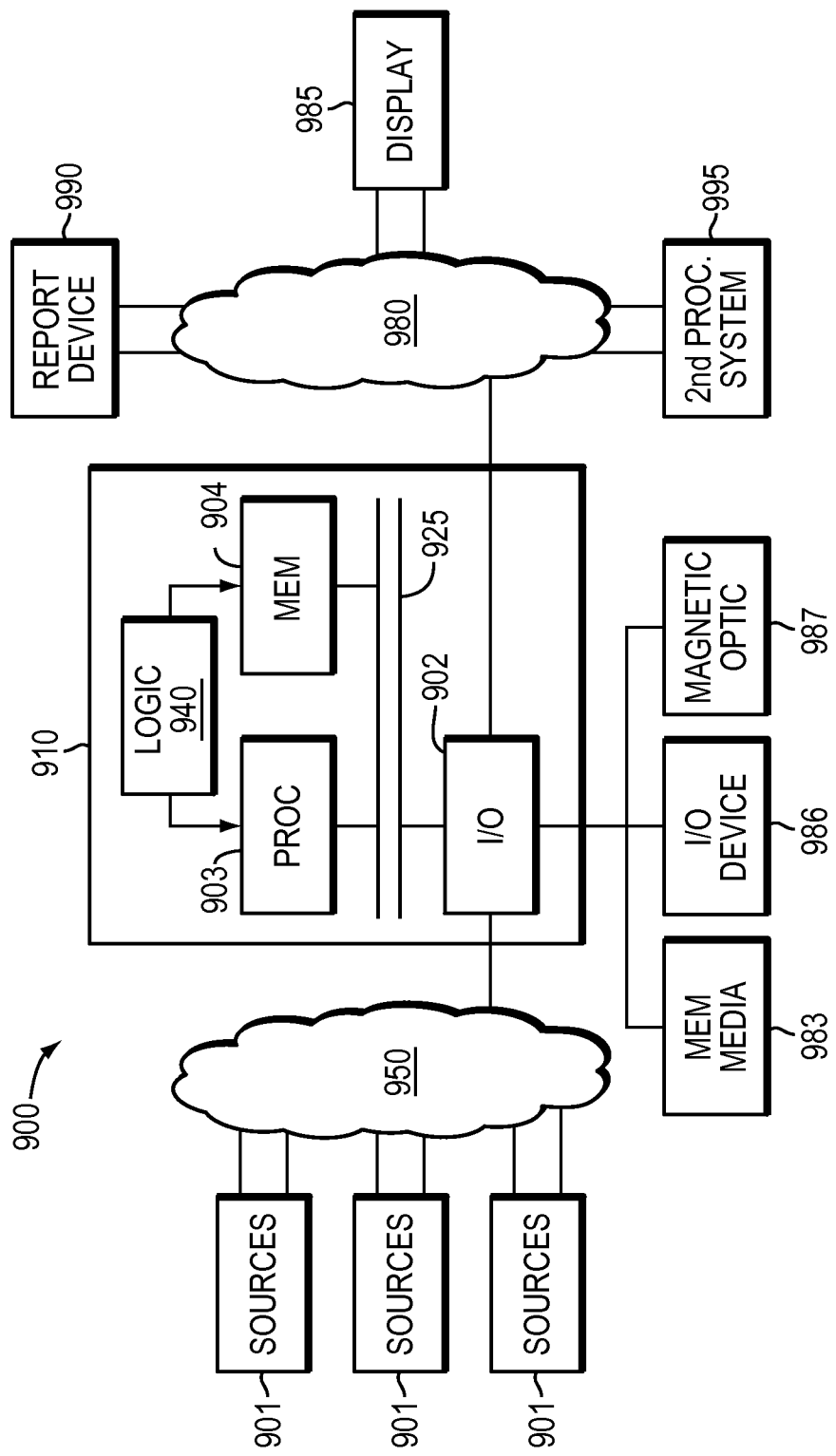
FIG. 9 is an example of an embodiment of an apparatus that may utilize the techniques described herein, in accordance with an embodiment of the present disclosure.
Figure 10:
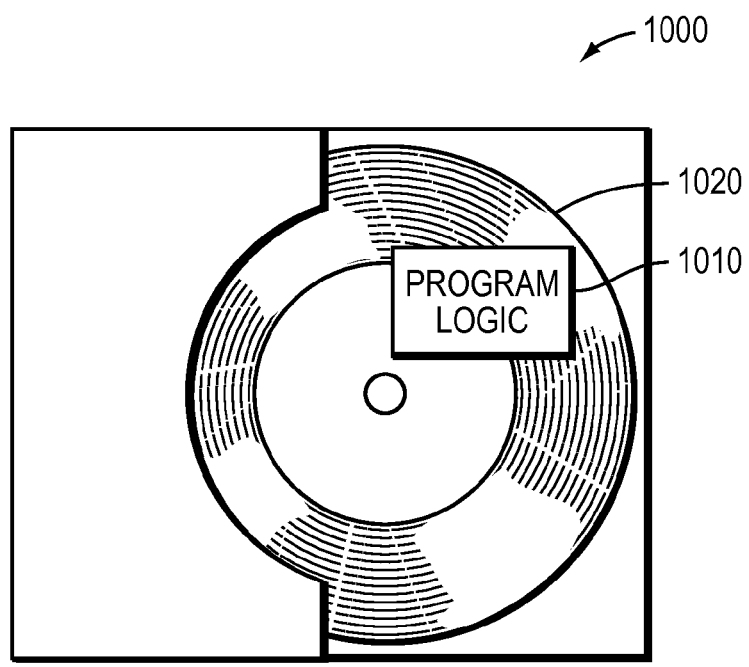
FIG. 10 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 10 shows Program Logic 1010 embodied on a computer-readable medium 1030 as shown, and wherein the Logic is encoded in computer-executable code configured for carrying out the reservation service process of this invention and thereby forming a Computer Program Product 1000. Logic 940 of FIG. 9 may be loaded into memory 904 and executed by processor 930. Logic 940 may also be the same logic 1010 on computer readable medium 1030.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for data replication, the system comprising:
a storage system, the storage system comprising a storage medium, a first storage processor (SP) having a first splitter, a second SP having a second splitter; and
computer-executable logic operating in memory, wherein the computer-executable program logic is configured for execution of:
receiving an IO at the first SP;
sending metadata corresponding to the IO to the second SP;
receiving an acknowledgement from the second SP indicating the second SP received the metadata; and
send the IO down an IO stack of the storage system.

2. The system of claim 1 further comprising a data protection appliance (DPA) and wherein the computer executable logic is further configured for execution of:
sending the IO to the DPA.

3. The system of claim 2 wherein the computer executable logic is further configured for execution of:
sending, from the first SP, a flush marker to the second SP;
putting the flush marker into the metadata list at the second SP;
confirming the DPA write the meta data up to the flush marker; and
send the a flush metadata end command to the second SP.

4. The system of claim 2 wherein the computer executable logic is further configured for execution of:
determining that a splitter is down;
stopping replication;
reading metadata in the splitter that has not failed; and
re-syncing data to the DPA based on the metadata.

5. The system of claim 2 further comprising a second DPA and wherein the computer executable logic is further configured for execution of:
determining that a DPA is down;
stopping replication;
reading metadata in the splitters; and
re-syncing data to the second DPA based on the metadata.

6. The system of claim 3 further comprising a second DPA and wherein the computer executable logic is further configured for execution of:
freeing, by the splitter at the second storage processor, the metadata before the flush marker.

7. A computer program product for use in replication comprising:
a non-transitory computer readable medium encoded with computer executable program code for data replication, the code configured to enable the execution of:
receiving an IO at a first storage processor (SP) of a storage system, wherein the storage system has a second SP;
sending metadata corresponding to the IO to the second SP;
receiving an acknowledgement from the second SP indicating the second SP received the metadata; and
send the IO down an IO stack of the storage system.

8. The program product of claim 7 wherein the executable program code is further configured for execution of sending the IO to a DPA.

9. The program product of claim 8 wherein the executable program code is further configured for execution of:
   sending, from the first SP, a flush marker to the second SP;
   putting the flush marker into the metadata list at the second SP;
   confirming the DPA write the meta data up to the flush marker; and
   send the a flush metadata end command to the second SP.

10. The program product of claim 8 wherein the executable program code is further configured for execution of:
    determining that a splitter is down;
    stopping replication;
    reading metadata in the splitter that has not failed; and
    re-syncing data to the DPA based on the metadata.

11. The program product of claim 8 wherein the executable program code is further configured for execution of:
    determining that a DPA is down;
    stopping replication;
    reading metadata in the splitters; and
    re-syncing data to the second DPA based on the metadata.

12. The program product of claim 9 wherein the executable program code is further configured for execution of:
    freeing, by the splitter at the second storage processor, the metadata before the flush marker.

13. A computer implemented method for data replication, the method comprising:
    receiving an IO at a first storage processor (SP) of a storage system, wherein the storage system has a second SP;
    sending metadata corresponding to the IO to the second SP;
    receiving an acknowledgement from the second SP indicating the second SP received the metadata; and
    send the IO down an IO stack of the storage system.

14. The computer implemented method of claim 13 wherein the method further comprising:
    sending the IO to a DPA.

15. The computer implemented method of claim 14 wherein the method further comprising:
    sending, from the first SP, a flush marker to the second SP;
    putting the flush marker into the metadata list at the second SP;
    confirming the DPA write the meta data up to the flush marker; and
    send the a flush metadata end command to the second SP.

16. The computer implemented method of claim 14 wherein the method further comprising:
    determining that a splitter is down;
    stopping replication;
    reading metadata in the splitter that has not failed; and
    re-syncing data to the DPA based on the metadata.

17. The computer implemented method of claim 14 wherein the method further comprising:
    determining that a DPA is down;
    stopping replication;
    reading metadata in the splitters; and
    re-syncing data to the second DPA based on the metadata.

18. The computer implemented method of claim 14 wherein the method further comprising:
    freeing by the splitter at the second storage processor, the metadata before the flush marker.

* * * * *